United States Patent [19]

Jurschak

[11] 3,845,247

[45] Oct. 29, 1974

[54] SIGNAL TRANSMISSION AND SURVEILLANCE SYSTEM USING AN OPERATIONAL TELEPHONE LINE

[76] Inventor: John J. Jurschak, 825 Casazza Dr., Reno, Nev. 89502

[22] Filed: May 15, 1973

[21] Appl. No.: 360,604

[52] U.S. Cl. .............................. 179/5 R, 179/175.2

[51] Int. Cl. .......................................... H04m 11/00

[58] Field of Search ..... 179/5 R, 5 P, 15 BF, 175.2, 179/175.3

[56] References Cited

UNITED STATES PATENTS

| | | | |
|---|---|---|---|
| 3,573,780 | 4/1971 | Butterbaugh | 179/5 R |
| 3,748,389 | 7/1973 | Casterline | 179/5 R |
| 3,767,867 | 10/1973 | Altenberger | 179/5 R |
| 3,786,501 | 1/1974 | Marnerakis | 179/5 R |

*Primary Examiner*—Ralph D. Blakeslee
*Attorney, Agent, or Firm*—Hiram A. Sturges

[57] ABSTRACT

An electronic signal transmission system having inherent diagnostic features designed to be connected to an operational telephone line for automatically sending and receiving information via this line without disrupting normal telephone service.

6 Claims, 5 Drawing Figures

SIGNAL TRANSMISSION AND SURVEILLANCE SYSTEM USING AN OPERATIONAL TELEPHONE LINE

FIELD OF THE INVENTION

This invention is in the field of systems for transmitting event signals over operational telephone lines in addition to transmission thereover of normal telephone system communication and signals.

DESCRIPTION OF THE PRIOR ART

Prior art remote event signal reporting, particularly the reporting of emergency events such as burglar and fire alarm signals, has generally been carried out by systems that differ from my invention in ways that are important, as explained hereafter.

A common prior art telephone alarm sending system is the automatic-telephone-dialer. In general, in response to an alarm, such a system seizes the telephone line, responds to operational signals produced in the telephone system, automatically dials a predetermined number address, and upon connection with a preselected station, transmits a suitable signal and/or aural message to notify the called station of the detected emergency condition. After the dialer-system message is sent to the called station, or stations, the system disconnects itself from the telephone line thereby restoring the telephone instrument to a useable status for ordinary service.

A desirable feature of the prior art automatic-telephone-dialer system is that it is only connected to the line at the subscriber end and doesn't necessitate any additional telephone line connections or modifications to the central office equipment and is compatible with most telephone systems. However, a significant disadvantage of automatic-telephone-dialer systems is that they do not provide "assured" event sending, e.g., a telephone line malfunction such as a short, or severance, renders such a system inoperative with the system having no provision to make a receiver station aware of the malfunction. In many applications, such automatic-telephone-dialer systems are unduly unreliable, in my opinion, as they are too vulnerable to being made inoperative by natural phenomena and easy to defeat by a burglar or vandal.

Two patented telephone alarm transmission systems which are not of the automatic-telephone-dialer type are known to me; both have a fundamental similarity to my invention. The common feature to my system being that these two prior art systems each send signals over an operational telephone line from the customer's premises and receive these signals prior to the telephone central office, thereby functionally by-passing the central office instead of going through it to another subscriber, i.e., alarm receiving station, as in the automatic-telephone-dialer approach.

One of these two partially similar prior art systems is the patent to R. D. Avery, et al, titled: "TELEPHONE SIGNAL REPORTING SYSTEM," U.S. Pat. No. 3,299,211, issued Jan. 17, 1967; this system seizes the line to send an event signal like an automatic-telephone-dialer does and similarly has no provision to detect line trouble.

The second of these two prior art patents is the patent to R. D. Huntington, Jr., et al., issued Dec. 7, 1954, and titled: "AUTOMATIC FIRE AND BURGLAR ALARM SYSTEM FOR TELEPHONE SUBSCRIBERS," U.S. Pat. No. 2,696,524. This system uses a "carrier current" method and is able to detect line trouble such as severance but, in my opinion, is easily defeated by a burglar making a simple electrical short of the telephone line to earth-ground.

The standard method of realizing "assured" alarm signal transmission is to employ a leased telephone line used only for alarm signal sending; "assured" meaning that those line malfunctions which render the system inoperative assuredly register in some manner at the receiver station. A disadvantage of such a system is the expense of a separate line exclusively for alarm signal sending.

The system described in copending application Ser. No. 256,464, filed May 24, 1972, and titled: "SIGNAL TRANSMISSION AND SURVEILLANCE SYSTEM USING A TELEPHONE SUBSCRIBER'S TELEPHONE LINE WITHOUT INTERFERING WITH NORMAL TELEPHONE OPERATION" is operative for assured information transmission without disrupting normal telephone service. The present invention is designed for the same purpose with the basic difference from the above-described system being that it doesn't employ the fundamental "counter modulation" principle of this prior art system.

SUMMARY OF THE INVENTION

Briefly, this invention is an electronic signal transmission and surveillance system employing an operational telephone line for the purpose of sending event signals, particularly alarm signals, in addition to the normal telephone system functions, except at times when a malfunction prevents such transmission, and at such times some form of malfunction status signal is delivered to the receiving station.

Throughout this application the invention is designated "T-TASS," which is an abbreviated acronyn for "telephone-transmission and surveillance system," also hereinafter the word "system," or the words "new system," both refer to this invention for the sake of brevity, unless specified otherwise.

A specific object of the invention is a more effective and efficient utilization of a telephone subscriber's line to transmit alarm messages. A manifestation of this objective is my new system's ability to continuously monitor the system's operational status and also the operational status of the telephone system which affects my system so as to detect malfunctions which make my system ineffective; in addition to limited real-time signal and/or aural message transmission via an operational telephone line without disrupting the normal working of the telephone system.

The continuous monitoring depicting more effective utilization is a principle feature of my system which substantially compensates for the aforementioned vulnerability of most prior art systems. This new signal transmission is more efficient because the system of this invention generally causes less telephone service degradation than prior art systems.

It is another object of this invention to provide a system which is simply connected to the telephone line.

It is still another object of this invention to provide a system that is operative in a multitone dialing as well as pulse dialing telephone system.

It is a further object of the invention to provide a system in which a plurality of condition responsive signals may be simultaneously transmitted over a single telephone line. Additionally, it is an object to provide a system in which a plurality of systems may be used with a single operational telephone line irrespective of whether the line is a single or multiple-party line.

It is still a further object of this invention to provide such system services at costs so low that the service will be widely used.

Other objects, together with the foregoing, are attained in the embodiments described in the following description and illustrated in the accompanying drawings.

The invention is described herein in terms of an illustrative embodiment adapted for use with a telephone system and is detailed in terms of block diagrams for which the technical feasibility has long been realized; the block diagram components can be physically implemented with known electronic circuit designs which in themselves constitute no newness. The newness of the invention is the way in which the system realizes non-interfering and assured signal transmission.

DESCRIPTION OF THE PREFERRED EMBODIMENT

Figure 1:
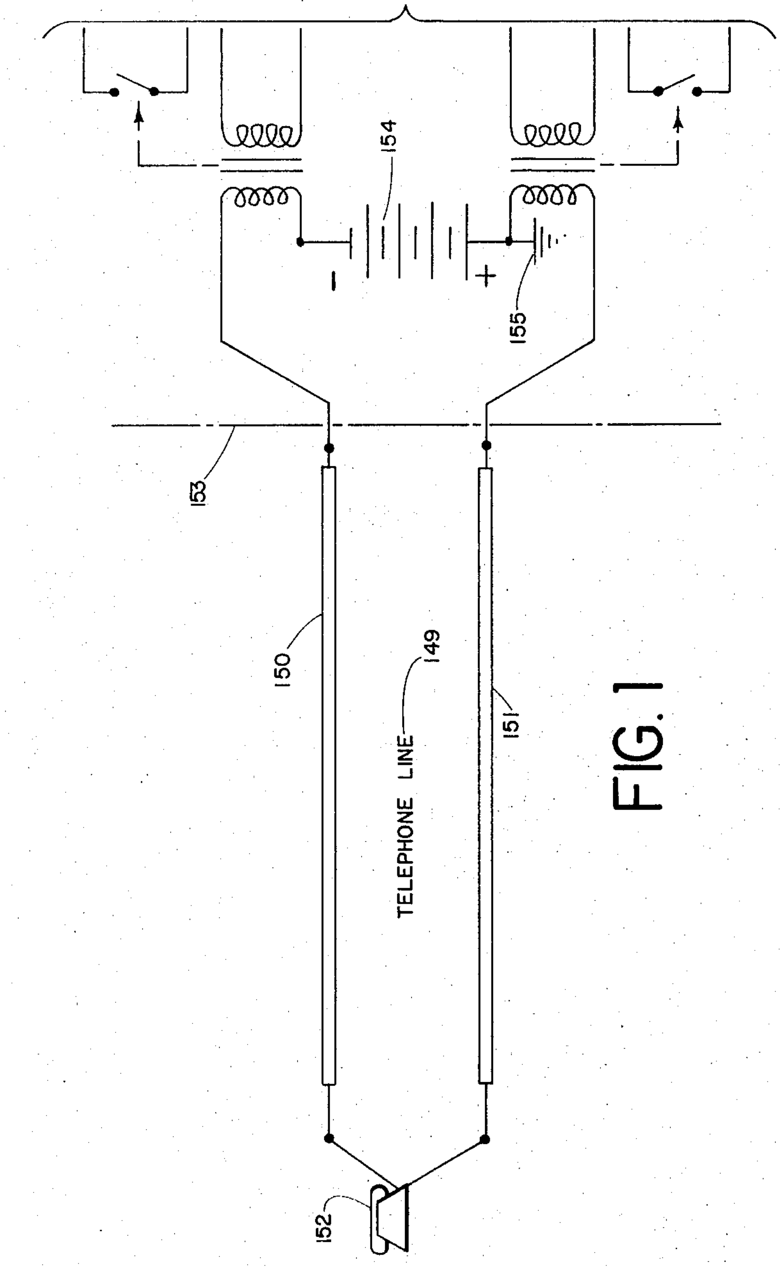
FIG. 1 is a diagram of a telephone instrument and a telephone exchange connected by a telephone line.

The generic T-TASS system consists of two separate units, namely, a first and second unit generally designated by reference numerals 200 and 300 respectively; each is connected to the telephone line 149 of a telephone system for signal transmission from the first unit to the second unit via this telephone line.

Referring to FIG. 1, there is shown a conventional telephone line 149 linking a telephone instrument 152 to a telephone exchange or central office 153, together defining a telephone system. Specifically, the telephone exchange 153 of FIG. 1 is a dial-central-office (DCO) exchange with a rudimentary schematic of the line terminating circuit shown. The DCO responds to pulse addresses of the standard 60/40 format generated by the local dial-telephone 152; additionally, the DCO can incorporate equipment to accept tone-pair bursts used in the TOUCH TONE dialing system of the American Telephone and Telegraph Company. The invention is capable of operating in conjunction with telephone systems using either dialing method.

The telephone line wire 150 is designated an "N-wire" as it is DC coupled to the negative terminal of the DCO battery 154; similarly, the telephone line wire 151 is designated a "P-wire" as it is DC coupled to the positive terminal of the DCO battery. N-wire 150 and P-wire 151 are conventionally referred to as Ring and Tip, respectively. The standard telephone system DCO battery voltage is 48 VDC with the positive terminal earth-grounded.

The telephone system has two operational states, on-hook and off-hook. On-hook is the state where the telephone 152 is disconnected from the telephone line 149; on-hook is abbreviated ONH. Off-hook is the state where the telephone 152 is electrically connected to the telephone line 149; off-hook is abbreviated OFH. In the majority of telephone systems, OFH (read off-hook) time is much less than the time spent in the ONH (read on-hook) state.

The normal ONH N-wire 150 DC voltage with respect to ground 155 is −48 volts, i.e., the DCO battery 154 voltage; the ONH P-wire 151 voltage with respect to ground is zero. The OFH N-wire 150 to ground 155 bias voltage is typically −27 VDC with the P-wire 151 to ground bias voltage typically at −21 VDC; this corresponds to an OFH telephone instrument 152 bias voltage of near 6 VDC. Should the central office 153 have line-polarity-reversing upon connection with an addressed party, the above-mentioned OFH telephone line wire 150, 151 voltages with respect to ground 155 are interchanged thereupon.

The herein operational description is with the T-TASS system of this invention connected to the telephone line of a standard dial-telephone system having a positive-grounded DCO battery, namely, the telephone system of FIG. 1. The following disclosure, excepting polarity differences, applies equally to a dial-exchange having a negative grounded battery.

In operation, the T-TASS system sends event signals by voltage modulating the telephone line 149 with a first unit 200 and sensing the line modulation with a distant, matched second unit 300; the line modulation being confined such that it is normally imperceptible to a telephone system subscriber or proprietor. The T-TASS system doesn't interfere with the normal working of the telephone system by seizing the telephone line, thus excluding telephone use to a subscriber, to send event signals. It is essential that the system not cause appreciable degradation to normal telephone service.

The functional component generally common to both units (200,300) of the system is the ONH-OFH detector (201,301). Telephone system state, i.e., ONH or OFH, detection is usually essential to the invention's operation as the system generally modulates the telephone line voltage differently for each state. The ONH-OFH detector is a high input impedance, voltage threshold circuit typically comprised of a Schmitt Trigger or differential comparator circuit.

When in the ONH state, the local telephone 152 is not in use and virtually the only requirements made upon the system are that of maintaining the open-circuit telephone line termination, e.g. resistance bridging N-wire 150 with a minimum of several kilo-ohms with respect to P-wire 151 or ground 155, and designing the system such that the telephone system ring-signal having 90-volt peaks does not impair system functioning.

When in the OFH state, the telephone instrument 152 is in use, hence making it requisite that the system not unduly disturb the several telephone signals, e.g., dial-tone, dial-pulse/TOUCH TONE addressing, ring-back & busy, and messages of the nominal 300 to 3,000 Hertz telephone spectrum; this makes a substantially balanced line 149 bridging impedance of several hundred ohms necessary.

In the ONH state, the system uses an audio-signal limited to a nominal frequency (Fourier) spectrum of several tens of Hertz to 30 Khz (Kilo-hertz) to modulate the telephone line voltage. A typical modulating signal magnitude of a few milliamps results in line voltage on the order of a volt. The receiver of the system's second unit serves to sense line (149) voltage caused by the transmitter ONH-modulating-signal of the system's first unit. The presence/absence of such modulation corresponding to an associated event/condition (s).

In the OFH state, the first unit's transmitter commonly relays an event/condition to the second unit's receiver by momentarily grounding, i.e., shorting to earth-ground, one of the telephone line wires 150,151; the receiver necessarily serves to sense such a telephone wire ground. Typically, the system does not modulate OFH line (149) voltage except for brief intervals.

The system of this invention is susceptible of numerous embodiments depending upon the requirements of use and the means of physical realization. The form diagramed in FIGS. 2 and 3 and disclosed herein is designed for "assured" sending of an alarm signal, e.g., burglary, and represents a preferred embodiment.

Figure 2:
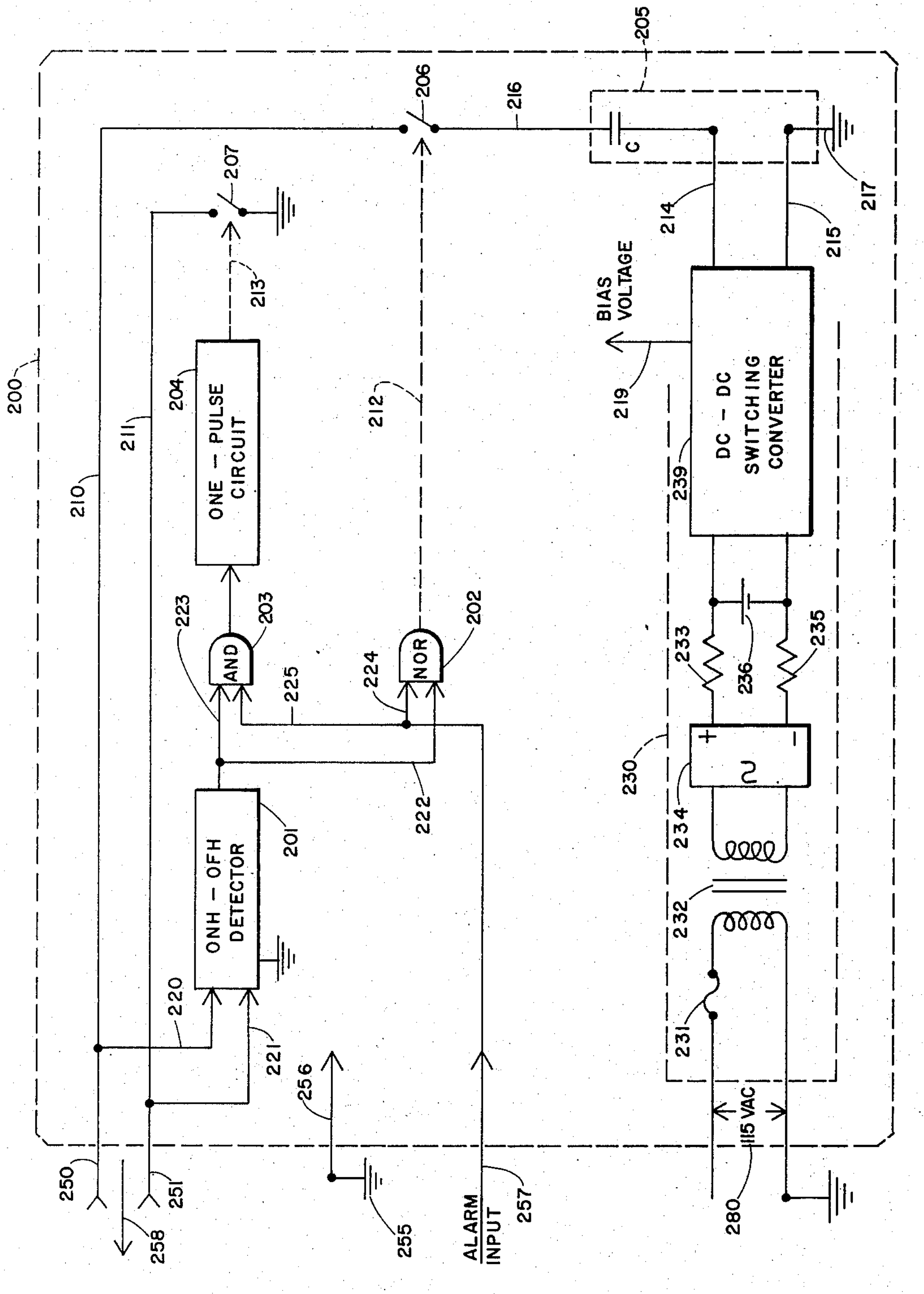
FIG. 2 is a block diagram of a transmitting unit according to the invention.

Reference is now had to FIG. 2. The system's first unit 200 is shown having an alarm signal input 257 in electrical form from an appropriate sensing transducer, output signal 258 being delivered to telephone line 149 by interface conductors 250 and 251 which are electrically connectable to telephone line wires 150 and 151 respectively, earth-ground 255 connection 256, and a 115 VAC, 50/60 HZ input 280 for electrical power. Earth-ground 255 is commonly derived from the electrical power input 280, as always a conductor is at earth potential.

The system's first unit 200 is functionally comprised of an ONH-OFH detector 201, transmitter, logic and control circuitry for this transmitter, and a power supply 230.

Input conductors 220 and 221 bridge the grounded ONH-OFH detector 201 to telephone line 149 through external conductors 250 and 251 respectively. As previously stated, the ONH-OFH detector serves to detect the telephone system state which is delivered to binary logic NOR 202 and AND 203 gates by lines 222 and 223 respectively. By design and/or convention, the ONH-OFH detector 201 output (222, 223) is a logical-one when an OFH condition prevails; conversely, it is a logical-zero for the ONH state.

As previously indicated, the first unit's (200) transmitter consists of an ONH and an OFH part. The modulating signal source 205 of the ONH part is commonly derived from a separate transformer winding in the unit's power supply 230, namely, through conductors 214 and 215 from switching converter 239 as depicted in FIG. 2. Capacitor C serves as a DC-blocking capacitor. The modulating source 205 has one terminal grounded at 217 with switch means 206 interposing between the other terminal 216 and external conductor 250 through a conductor 210. Switch means 206 is typically a normally-open pair of relay contacts; when the relay is energized via 212, contacts 206 close and connect the audio-signal source 205 to N-wire 150 of the telephone line. The OFH part is comprised of switch means 207 which also is typically a normally-open pair of relay contacts. Upon relay energization via 213, contacts of the switch means 207 close thereby grounding the telephone line's P-wire 151 through a conductor 211.

A power supply 230 generates the DC bias voltage at 219 required by the unit's circuitry. In general, 115 VAC, 50/60 HZ (280) electrical power is delivered through a fuse 231 to a step-down filament transformer 22 from which it is transformed to a DC voltage by a rectifier element 234. This rectified DC voltage is then delivered through a pair of current regulating resistors 233, 235 to a storage battery (nickel-cadmium) 236 and a DC-DC switching converter 239. The converter circuit 239 then transforms the input battery 236 voltage to the requisite circuit bias voltage or voltages 219 and additionally serves to provide an audio-signal 205 for line 149 modulation. The design of DC-DC converters and, in general, audio-signal sources is well known in the art and therefore need not be discussed in detail herein.

The first unit's 200 logic and control circuitry is comprised of two-input NOR 202 and AND 203 gates, and a one-pulse circuit 204 which is typically a conventional one-shot or monostable multivibrator. Upon being triggered with a logic-one input, the circuit 204 output becomes a logic-one which lasts for some period of time such as 750 milliseconds. Besides the line 149 state (222, 223), alarm input 257 is delivered to both gates 202, 203 by lines 224, 225 respectively. By specification, first unit input 257 is a logical-one when an "alarm condition" exists, otherwise it is a logical-zero.

If it be arbitrarily assumed that the telephone system (149) be in the ONH state, the ONH-OFH detector's 201 output, as previously noted, will be a logical-zero. It follows that this causes switch 207 to be open. When an alarm condition does not exist, input 257 is a logical-zero. Accordingly, logical-zero inputs 222, 224 result in a logical-one (energization) from NOR gate 202, hence 212 closes switch 206, thereby enabling source 205 to modulate the N-wire 150 voltage. Conversely, it similarly follows that an alarm input, i.e., 257 a logical-one, will have switch 206 open. Therefore, during an ONH state, an unmodulated N-wire 150 transmits (258) an alarm condition.

Now if the telephone system arbitrarily be in the OFH state, an ONH-OFH detector 201 logical-one prevails, thus having switch 206 open so that modulating source 205 is isolated from the line, namely, N-wire 150. When an alarm condition is absent, input 257 is a logical-zero and hence AND gate 203 cannot trigger one-pulse circuit 204. But, upon receipt of an alarm condition, logic-one inputs 223, 225 to AND gate 203 result in triggering one-pulse circuit 204, hence 213 (energization) momentarily closes switch 207 and grounds P-wire 151. Thus, during an OFH state, an alarm condition is transmitted at arrow 258 by momentarily grounding P-wire 151.

Figure 3:
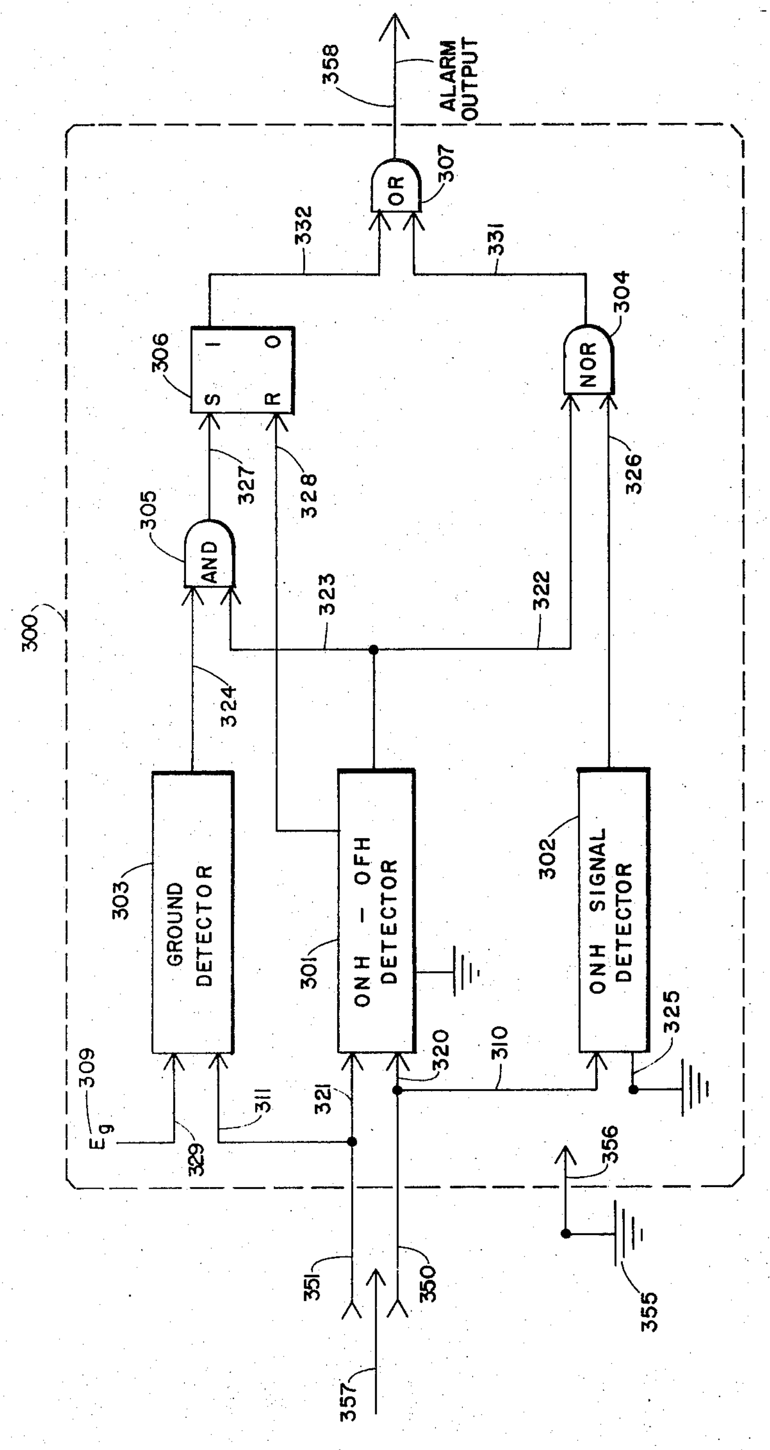
FIG. 3 is a block diagram of a receiving unit matched to the transmitting unit of FIG. 2 according to the invention.

The preferred embodiment's second unit is diagramed in FIG. 3. The second unit 300 is shown having an input signal 357 delivered from the telephone line 149 by interface conductors 350 and 351, which latter are electrically connectable to telephone line wire 150 and 151 respectively, earth-ground 355 connection 356, and an alarm output signal 358 in electrical form which is connectable to appropriate means for further transmission, encoding, or/and conversion to a humanly sensible form.

The system's second unit 300 is functionally comprised of an ONH-OFH detector 301, receiver, and logic and memory circuitry. The power supply is not integral to the design and so is omitted as it contributes no newness.

Input conductors 320 and 321 bridge grounded ONH-OFH detector 301 to telephone line 149 through external conductors 350 and 351 respectively. The ONH-OFH detector monitors the telephone system state and delivers such to binary logic NOR 304 and AND 305 gates by lines 322 and 323 respectively. As before, by design and/or convention, the ONH-OFH detector 301 output (322, 323) is a logical-one for the OFH state and a logical-zero when the ONH state prevails.

In accordance with the foregoing, the second unit's 300 receiver is comprised of separate ONH and OFH parts. The ONH signal detector 302 comprises the ONH part and the ground detector 303 comprises the OFH part.

Detector circuit 302 typically comprises an AC coupled, high input impedance, differential amplifier circuit having provision for adequate selectivity and noise rejection; one input 310 thereof is connected to N-wire 150 via an external conductor 350 and the other input 325 thereof is grounded.

In operation, when the detector 302 senses N-wire 150 voltage, i.e. with respect to ground, caused by the first unit's 200 transmitter, its output becomes a logical-one; conversely, it is a logical-zero otherwise. The bilevel output is coupled via line 326 to the two-input NOR gate 304, the other input 322 being from ONH-OFH detector 301.

The ground detector 303 is typically comprised of a high input impedance, differential comparator circuit of which one input 311 is P-wire 151 voltage delivered via external conductor 351, and the other 329, some suitable internal DC reference voltage e.g. Eg 309 which corresponds to a limiting grounded-line voltage such as −5 volts. The detector's 303 output is designed to be a logical-one upon sensing a "grounded-P wire 151" condition. The bilevel output is coupled via line 324 to two-input AND gate 305, the other input 323 is from the ONH-OFH detector.

The logic and memory circuitry is comprised of the heretofore mentioned NOR 304 and AND 305 gates, a binary memory element, namely, conventional R-S flip-flop 306, and the two-input OR gate 307. A set (S) input 327 of a logical-one sets flip-flop 306 to a logical-one (332); conversely, a reset (R) input of a logical-one from the "inverted output" 328 of ONH-OFH detector 301 sets the flip-flop to a logical-zero (322).

If it be arbitrarily assumed that the telephone system be in the ONH state, ONH-OFH detector 301 will cause one input 323 of AND gate 305 to be a logical-zero; this results in a logical-zero on line 327. Conversely, reset input 328 is a logical-one, i.e., inverted ONH. Thus flip-flop 306 (332) is always in a logical-zero state when the line 149 is in an ONH condition.

When an alarm condition is not transmitted by the system's first unit, i.e. modulated (357) N-wire 150, line 326 will deliver a logical-one to NOR gate 304, thereby having it also deliver a logical-zero via line 331 to OR gate 307. Consequently, the second unit's, i.e. OR gate 307, output 358 is a logical-zero which represents a no-alarm condition. By design, the second unit output 358 is caused to be a logical-one when an "alarm condition" is received, otherwise it is a logical-zero.

Should N-wire 150 be unmodulated by first unit 200, i.e. alarmed, the logical-zero output of ONH signal detector 302 will have both inputs 322, 326 a logical-zero. Therefore, a logical-one (331) from NOR gate 304 causes OR gate 307 output 358 to be a logical-one which represents an actual "alarm condition" delivered to (257) first unit 200.

Now if the telephone system arbitrarily be assumed in the OFH state, the ONH-OFH detector will cause one input 322 of NOR gate 304 to be a logical-one; the output 331 of which then is a logical-zero. Also, flip-flop 306 reset input 328 is a logical-zero, i.e. inverted OFH, thereby enabling the flip-flop to be set to a logical-one state (332), should set input 327 become such.

Provided an alarm condition is not transmitted by the system's first unit, i.e., undisturbed (357) P-wire 151, line 324 will deliver a logical-zero to AND gate 305. Consequently, the output 327 of this gate remains a logical-zero, thus having flip-flop 306 remain in a logical-zero state (332). It follows that the second unit's output 358 is a logical-zero representing a no-alarm condition.

Now should P-wire 151 be grounded, i.e., alarmed, the logical-one output of ground detector 303 and ONH-OFH detector 301 will realize (305) a logical-one to set flip-flop 306. In turn, line 332 carries a logical-one from this flip-flop to OR gate 307, thus causing 358 to be a logical-one and representing an actual "alarm condition" delivered to (257) first unit 200. It is to be noted that an OFH alarm output (358) remains, regardless of the following first unit's input (257) status and is negated only upon the telephone system returning to the OHN state; flipflop 306 (332) is then reset by inverted output 328 of the ONH-OFH detector.

It is to be recognized that the foregoing preferred embodiment additionally provides for telephone line surveillance, i.e., "assured" alarm sending. That is to say, this system has intrinsic provision to alert upon telephone line trouble such as severance, a ground, or shorting. Such line malfunctions will cause an alarm output (i.e., logical-one) 358 should this system be rendered inoperative for alarm sending.

Each malfunction will now be examined.

As will be obvious, P-wire 151 severance, when in the ONH state, does not affect system operation; however, such will prevent the telephone system from engaging the OFH state. Additionally, N-wire 150 or line 149 (both wires) severance will disable both the T-TASS and telephone systems.

As will be understood, P-wire 151 grounding, when in the ONH state, does not affect either T-TASS or telephone system; however, OFH P-wire grounding is equivalent to the sending of an alarm condition by the system's first unit 200. Grounding N-wire 150, or both line wires, ensures an OFH state, while also causing an alarm condition to be transmitted.

While telephone line shorting has an OFH state whether or not the local phone was in use at the time of occurrence, its effect upon the system is innocuous. However, capacitive bridging of the telephone line, i.e., an AC short, will transmit an alarm condition.

Although not heretofore stated, timing circuitry to ensure proper T-TASS operation during telephone system state transitions, e.g. OFH to ONH, and signal periods, e.g., ring-signal, is implicit in the block diagrams of FIGS. 2 and 3. It will be recognized that such timing circuitry is requisite but does not constitute an actual embodiment of the invention.

It is to be noted that for proper T-TASS operation, ground resistance between the system's first unit, i.e., 255, and second unit, i.e., 355, must be restricted to a maximum ohmage. For the ONH State, this value is typically a few kilo-ohms and is related to the source impedance of the first unit's audio-signal source(s). For the OFH state, this resistance is related to the limiting "grounded-line" voltage; for −5 volts, the maximum is near a hundred ohms. Therefore, in general, the OFH state circuitry defines the acceptable ground-separation resistance.

It is to be emphasized that the ONH-OFH detector (201, 301) of the invention can be designed to function properly with only a single N-wire or P-wire input connection. For example: When in the ONH state, N-wire 150 voltage more negative than a median threshold voltage of −35 VDC with respect to ground prevails; conversely, a more positive N-wire voltage exists in the OFH state. Similarly, P-wire 151 voltage is more positive than a median threshold voltage of −10 VDC with respect to ground when in the ONH state; conversely, a more negative P-wire voltage prevails for the OFH state.

Figure 4:
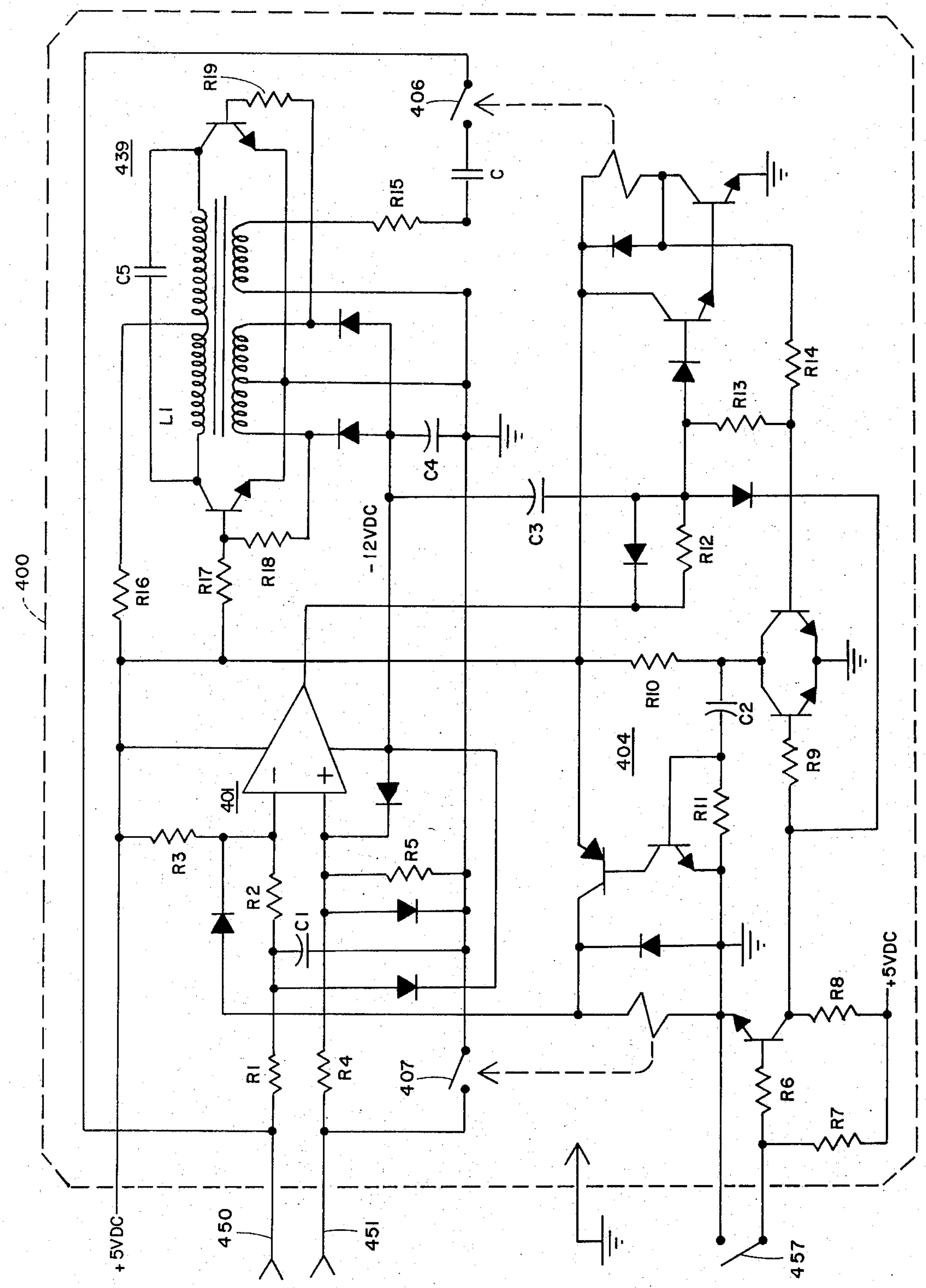
FIG. 4 is the schematic diagram of a circuit suitable for serving as the first unit (less the power supply's AC-DC part) of the T-TASS system according to FIG. 2.
Figure 5:
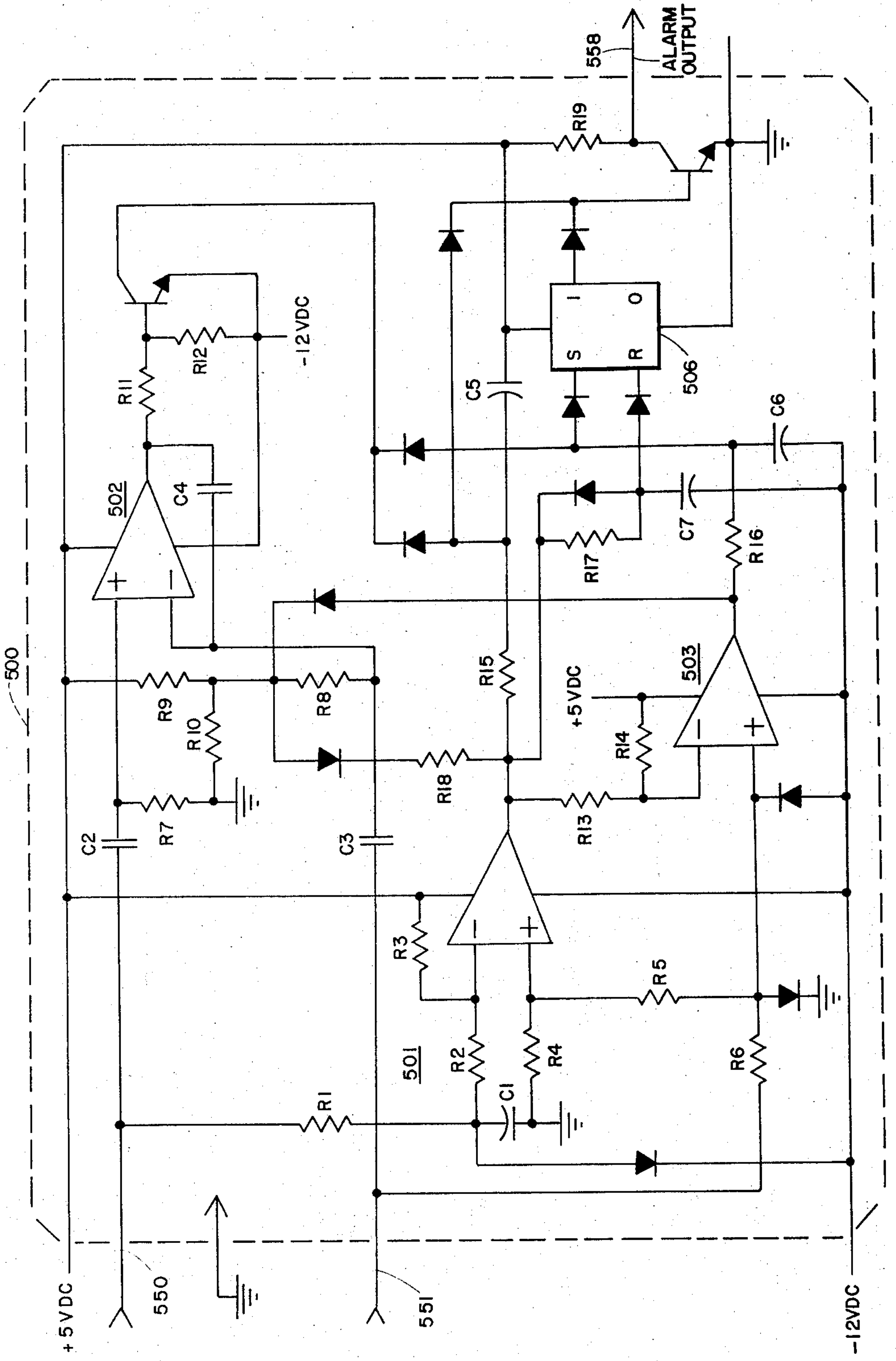
FIG. 5 is the schematic diagram of a circuit suitable for serving as the second unit of the T-TASS system according to FIG. 3.

Attention now focuses on a realization of the preferred embodiment of the foregoing disclosure. The circuits of FIGS. 4 and 5 are implementations designed in accordance with the block diagrams of FIGS. 2 and 3, respectively. The subcircuits of 400 and 500 represent ordinary circuit designs; however, this is not to imply that component electronics for the invention couldn't be realized at some future date which in itself would be considered a patentable invention.

Referring to FIG. 4, implemented first unit 200 is indicated by numeral 400. Alarm transducer output single-pole single-throw (SPST) switch 457 corresponds to alarm input 257, and telephone line connecting conductors 450 and 451 respectively correspond to conductors 250 and 251. Principal first unit parts, namely, ONH-OFH detector 201, one-pulse circuit 204 and DC-DC converter 239 are generally designated by numerals 401, 404 and 439 respectively; normally open relay contacts 406 and 407 respectively correspond to switches 206 and 207.

Reference is now had to FIG. 5. Implemented second unit 300 is indicated by numeral 500. Telephone line connecting conductors 550 and 551 respectively correspond to conductors 350 and 351, and output 558 corresponds to alarm output 358. Principal second unit parts, namely, ONH-OFH detector 301, ONH signal detector 302 and ground detector 303 are generally designated by numerals 501, 502 and 503 respectively; flip-flop 506 corresponds to R-S flip-flop 306.

FIG. 4 shows alarm input switch 457 in the alarm position; an output 558 of near zero volts (saturated collector-emitter voltage) represents a received alarm while a high output (+5 volts) represents the absence of an alarm. Operation of the realization of FIGS. 4 and 5 is readily analyzed by one conversant in the art of solid-state circuitry. However, in general, better performance and efficiency of design is realized when both telephone line 149 wires are available.

As previously indicated, the invention is susceptible of numerous embodiments in addition to the system of FIGS. 2 and 3.

For example, the system of the foregoing preferred embodiment does ONH signal sending by varying the amplitude of the modulating audio-signal, i.e., from source 205, applied to the telephone line's N-wire; OFH signal sending is done by momentarily grounding the telephone line's P-wire.

It should be evident that P-wire 150 and ground, or N wire 150 and P-wire 151 (i.e., bridging line 149) could have been used instead of N-wire 150 and ground for the ONH signal sending. Additionally, N-wire 150 could have been grounded instead of P-wire 151 for OFH signal sending; the P-wire is generally preferred as it usually causes less audible interference and dialing disruption.

It should also be evident that the present system can be adapted to send a plurality of event signals over a single operational telephone line by separate telephone line wire (and ground return) useage and incorporating known digital/frequency multiplexing methods. For example: When in the ONH state, amplitude-shift-keying (ASK), frequency-shift-keying (FSK) and, of course, frequency multiplexing "Data Transmission," McGraw-hill, 1965 by W. R. Bennett & J. R. Davey treats these and other modulation methods. When in the OFH state, coded keying of the system's switch means; additionally, the system audio-signal means can also be used for OFH telephone line modulation, however, in my opinion, line-grounding modulation is preferred, as it results in less audible interference.

As is obvious, each event signal of a plurality must be uniquely encoded by the system's first unit so as to be discernible to the system's second unit, e.g., frequency multiplexing in which different frequencies and tuned circuits are used for each event.

Moreover, a plurality of systems could be used simultaneously on the same telephone line, e.g., a party line where two or more telephone subscribers use the same telephone line. The principle of operation being the same as that for sending a plurality of event signals over a single telephone line.

Although the foregoing disclosure is illustrative of an alarm embodiment of the invention, it will be understood that systems of this invention could be adapted to transmit analog or continuous level signals.

As will be recognized, the system of this invention can be implemented with state of the art electronics by one conversant with such, and installed at costs competitive with similar systems now in use.

For purposes of illustration, the following values of circuit components in the schematic diagrams of FIGS. 4 and 5 may be regarded as practical:

IN FIGURE 4

RESISTORS:
R1 = 56K
R2 = 1M (1000K)
R3 = 180K
R4, 14 = 100K (each)
R5, 8, 13 = 33K (each)
R6, 7, 9 = 68K (each)
R10 = 10K
R11, 15 = 5.6K (each)
R12, 17, 18 = 22K (each)
R16 = 33 ohms
R19 = 15K -Continued CAPACITORS:
C = 0.022 μf
C1 = 1 μf
C2 = 100 μf
C3, 4 = 10 μf (each)
C5 = 0.01 μf

IN FIGURE 5

RESISTORS:
R1, 4, 15 = 68K (each)
R2 = 1M
R3 = 160K
R5, 6, 7, 8, 9, 14, 17 = 100K (each)
R10 = 1.8K
R11 = 5.6K
R12 = 1K
R13, 16 = 33K (each)
R18 = 22K
R19 = 10K CAPACITORS:
C1 = 1 μf
C2, 3 = 0.001 μf (each)
C4 = 15 pf (pico-farads)
C5, 6, 7 = 10 μf (each)

During the ONH state, this implementation modulates the telephone N-wire with a square-wave current of 2 milliamperes; a typical ferrite transformer primary inductance, i.e., L1, of 50 millihenries has a frequency of 7 KC (kilocycles per second). The transistors used throughout this implementation are high-beta silicon devices, e.g., 2N4124, except for the PNP transistor (2N4126) and are available at low cost; diodes are low cost silicon diodes such as the 1N4148 signal diode; the differential input operational amplifiers are monolithic type 741 (MC1741C), and the R-S flip-flop can be realized with a monolithic MC3055 TTL logic circuit — "The Semiconductor Data Library," Motorola, Inc., 1972.

It can, therefore, be seen that I have provided a new and useful signal transmission system for use with operational telephone lines which not only has line surveillance capability, but also is relatively economical. Accordingly, the invention is not to be limited to what has been particularly shown and described, except as indicated in the appended claims.

I claim:

1. An electronic signal transmission system comprising a first unit, said first unit comprising a transmitter, a second unit, said second unit comprising a receiver matched to said transmitter, a telephone transmission line having two wires, conductive means connecting said first unit to said telephone line, conductive means cooperatively connecting said second unit to said telephone line, a telephone, a telephone exchange, said telephone line connecting said telephone and said telephone exchange, said telephone and said telephone line and said telephone exchange together defining a telephone system, said telephone exchange causing a DC bias current on said telephone line when said telephone is electrically connected to said line sufficient for message transmission between said telephone and said exchange, normal current on said telephone line which is not caused by said signal transmission system being telephone system current, said first and second units being of sufficiently high resistance so as to substantially reduce DC loading of said line, said first and second units of sufficiently high and balanced impedance to telephone system AC voltage on said line as to substantially reduce attenuation of said voltage and unbalancing of said line by said telephone system AC units, said first and second units comprising means to detect the state of said telephone system, said transmitter comprising audio-signal means for modulating said telephone line voltage, said first unit being adapted to receive an event signal, said transmitter modulating the voltage of said line in accordance with said telephone system state and said event signal in a way which is discernible to said receiver, said receiver sensing said modulated telephone line voltage, said second unit transforming said modulation into an output signal, said output signal being electrically connectable to a suitable means for utilization.

2. The system of claim 1 in which said transmitter audio-signal modulating means bridges one of said telephone line wires and earth-ground for use when said telephone system is in the on-hook state, said receiver also bridging said one of said telephone line wires and said earth ground.

3. The system of claim 1 in which said transmitter audio-signal modulating means bridges said telephone line for use when said telephone system is in said on-hook state, said receiver also bridging said telephone line.

4. The system of claim 1 in which said transmitter has a normally-open switch means closable for signalling an event during the off-hook state, said switch means bridging one of said telephone line wires and said earth-ground, said transmitter also having switch control means which latter momentarily closes said switch means thereby grounding said one telephone line wire whenever said event signal is delivered to said control means, said receiver also bridging said one of said telephone line wires and said earth-ground.

5. The system of claim 1 further comprising said second unit having flip-flop circuitry for storage of a receiver-sensed grounded telephone line condition during said off-hook state.

6. The system of claim 1 further incorporating multiplex means in said units for the sending of a plurality of said event signals.

* * * * *

UNITED STATES PATENT OFFICE
CERTIFICATE OF CORRECTION

Patent No. 3,845,247 Dated October 29, 1974

Inventor(s) John J. Jurschak

It is certified that error appears in the above-identified patent and that said Letters Patent are hereby corrected as shown below:

Column 6, line 10, "22" should read -- 232 --.

Column 8, line 38, "OHN" should read -- ONH --.

Column 9, line 30, after "state" insert -- However, in general, better performance and efficiency of design is re lized when both telephone line 149 wires are available --.

Column 9, line 62, "however, in general, better perform-" should be deleted.

Column 10, lines 1 and 2 "ance and efficiency of design is realized when both telephone line 149 wires are available" should be deleted.

Column 12, line 10, after "of said" -- telephone system AC -- should be inserted.

Column 12, line 11,"telephone system AC" should be deleted.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*